United States Patent
Yates et al.

(10) Patent No.: US 9,195,695 B2
(45) Date of Patent: Nov. 24, 2015

(54) TECHNIQUE FOR COMPRESSING COLUMNS OF DATA

(75) Inventors: John Yates, Concord, MA (US);
Michael Sporer, Wellesley, MA (US);
Sharon Miller, Boxborough, MA (US)

(73) Assignee: IBM International Group B.V., Amsterdam (NL)

( * ) Notice: Subject to any disclaimer, the term of this patent is extended or adjusted under 35 U.S.C. 154(b) by 1114 days.

(21) Appl. No.: 11/900,931

(22) Filed: Sep. 13, 2007

(65) Prior Publication Data

US 2008/0222136 A1 Sep. 11, 2008

Related U.S. Application Data

(60) Provisional application No. 60/844,834, filed on Sep. 15, 2006.

(51) Int. Cl.
*G06F 7/00* (2006.01)
*G06F 17/30* (2006.01)

(52) U.S. Cl.
CPC .... *G06F 17/30321* (2013.01); *G06F 17/30153* (2013.01); *G06F 17/30371* (2013.01)

(58) Field of Classification Search
CPC .............. G06F 17/30153; G06F 17/30371
USPC ............................. 707/101, 999.101, 687, 693
See application file for complete search history.

(56) References Cited

U.S. PATENT DOCUMENTS

| | | | |
|---|---|---|---|
| 5,295,256 A * | 3/1994 | Bapat | 717/137 |
| 5,406,279 A * | 4/1995 | Anderson et al. | 341/51 |
| 5,502,439 A * | 3/1996 | Berlin | 341/51 |
| 5,506,580 A * | 4/1996 | Whiting et al. | 341/51 |
| 5,918,225 A * | 6/1999 | White et al. | 1/1 |
| 6,128,621 A * | 10/2000 | Weisz | 1/1 |
| 6,310,563 B1 * | 10/2001 | Har et al. | 341/50 |
| 6,424,972 B1 * | 7/2002 | Berger et al. | 1/1 |
| 6,535,925 B1 * | 3/2003 | Svanbro et al. | 709/247 |
| 6,714,935 B1 | 3/2004 | Delo | |
| 6,965,897 B1 * | 11/2005 | Chen | 1/1 |
| 7,024,414 B2 * | 4/2006 | Sah et al. | 1/1 |
| 7,028,039 B2 | 4/2006 | Burrows et al. | |
| 7,383,270 B1 * | 6/2008 | Kostamaa et al. | 707/693 |
| 7,548,928 B1 * | 6/2009 | Dean et al. | 1/1 |
| 2002/0095561 A1 | 7/2002 | Butler | |
| 2004/0004563 A1 * | 1/2004 | Jones et al. | 341/87 |
| 2004/0078355 A1 | 4/2004 | Suresh | |
| 2004/0215593 A1 | 10/2004 | Sharangpani et al. | |
| 2005/0262121 A1 | 11/2005 | Cesare et al. | |
| 2006/0123035 A1 * | 6/2006 | Ivie | 707/101 |
| 2006/0195420 A1 | 8/2006 | Kilroy | |

* cited by examiner

*Primary Examiner* — Rehana Perveen
*Assistant Examiner* — Mark E Hershley
(74) *Attorney, Agent, or Firm* — Mohammed Kashef; Edell, Shapiro & Finnan, LLC

(57) ABSTRACT

An approach for providing compression of a database table that uses a compiled table algorithm (CTA) that provides leverage. Data within any given column in adjacent rows is often the same as or closely related to its neighbors. Rather than storing data in each column of each row as a specific integer, floating point, or character data value, a field reconstruction instruction is stored that when executed by a decompression engine can reconstruct the data value. The field reconstruction instruction may be bit granular and may depend upon past history given that the data compression engine may preserve state as row data is streamed off a storage device.

26 Claims, 14 Drawing Sheets

| | FIELD RECONSTRUCTION INSTRUCTION | | | FIELD ENGINE STATE FOLLOWING FRI EXECUTION | | | | |
|---|---|---|---|---|---|---|---|---|
| VALUE | LOC | FRO | ARG | PEF[0] | PEF[1] | PEF[2] | SAVED | DELTA |
| RESET | | | | NULL | NULL | NULL | 0 | 0 |
| 31000 | INLINE | FULL | | FULL | NULL | NULL | 0 | 0 |
| 31000 | INLINE | SAVED | | SAVED | FULL | NULL | 31000 | 0 |
| 31000 | PEF[0] | [SAVED] | | SAVED | FULL | NULL | 31000 | 0 |
| 31001 | INLINE | DELTA_A | +1 | DELTA_A | SAVED | FULL | 31000 | +1 |
| 31001 | PEF[1] | [SAVED] | | SAVED | DELTA_A | FULL | 31001 | +1 |
| 0 | INLINE | EMPTY | | EMPTY | SAVED | DELTA_A | 31001 | +1 |
| 0 | PEF[0] | [EMPTY] | | SAVED | EMPTY | EMPTY | 31001 | +1 |
| 31001 | PEF[1] | [SAVED] | | DELTA_A | SAVED | DELTA_A | 31001 | +1 |
| 31003 | PEF[2] | [DELTA_A] | +2 | SAVED | DELTA_A | EMPTY | 31003 | +2 |
| 31003 | PEF[1] | [SAVED] | | ADD | SAVED | EMPTY | 31003 | +2 |
| 31005 | INLINE | ADD | | ADD | SAVED | DELTA_A | 31005 | +2 |
| 31007 | PEF[0] | [ADD] | | | SAVED | DELTA_A | 31007 | +2 |

FIG. 7

| | FIELD SIZE IN BYTES & DELTA ARGUMENT SIZE IN BITS | | | | | |
|---|---|---|---|---|---|---|
| | 16B | 12B | 8B | 4B | 2B | 1B |
| FRO | 27 | 21 | 27 | 13 | 7 | 1 |
| DELTA_A | 43 | 39 | 41 | 20 | 10 | 3 |
| DELTA_B | 79 | 67 | 59 | 27 | 13 | 6 |

FIG. 9

| LOCATOR | SEMANTICS | OLD STACK | NEW STACK |
|---|---|---|---|
| PEF0 | STACK IS UNCHANGED. | 0 | 0 |
|  |  | 1 | 1 |
|  |  | 2 | 2 |
| PEF1 | VALUE AT PEF[0] IS SWAPPED WITH THE VALUE AT PEF[1]. | 0 | 1 |
|  |  | 1 | 0 |
|  |  | 2 | 2 |
| PEF2 | ROTATE THE STACK TO PUT PEF[2] INTO PEF[0]. | 0 | 2 |
|  |  | 1 | 0 |
|  |  | 2 | 1 |
| INLINE | PUSH THE INLINE FRO ONTO THE STACK. THE OLD PEF[2] IS GONE. | 0 | NEW |
|  |  | 1 | 0 |
|  |  | 2 | 1 |

FIG. 10

|  | bit 0 | bit 1 | bit 2 |
|---|---|---|---|
| PEF0 | 0 |  |  |
| PEF1 | 1 | 0 | 0 |
| PEF2 | 1 | 0 | 1 |
| INLINE | 1 | 1 |  |

FIG. 11

| LOCATOR | SEMANTICS |
|---------|-----------|
| PEF0 | THE FRO IS LOCATED IN THE $0^{th}$ INDEX OF THE PEF STACK |
| PEF1 | THE FRO IS LOCATED IN THE $1^{st}$ INDEX OF THE PEF STACK |
| PEF2 | THE FRO IS LOCATED IN THE $2^{nd}$ INDEX OF THE PEF STACK |
| INLINE | THE FRO STARTS IN BIT 2, IMMEDIATELY FOLLOWING THE LOCATION |

FIG. 12

| VALUE | OPERATION | VALUE | OPERATION(ARG) |
|---|---|---|---|
| 0 | NULL | 1 | DELTA_A() |
| 1 | EMPTY | 5 | DELTA_B() |
| 2 | SAVED | 6 | DELTA_C() |
| 3 | ADD | 7 | FULL() |

FIG. 13

TECHNIQUE FOR COMPRESSING COLUMNS OF DATA

RELATED APPLICATION(S)

This application claims the benefit of Provisional Patent Application No. 60/844,834 filed Sep. 15, 2006, entitled "Technique for Compressing Columns of Data", the entire contents of which are hereby incorporated by reference.

BACKGROUND AND SUMMARY OF THE INVENTION

1. Introduction 1.1 Horizontal Database Storage

Most databases and specialized data processors (Scan Engines) for handling database records are built on a horizontal storage framework. Rows are serialized into a single container, and within that container all fields within any given row occupy an unbroken sequence of bits/bytes. This is a natural representation that straightforwardly accommodates Structured Query Language (SQL) create table actions via creation of a single container, and loading of row-oriented data into the container without the need for data rearrangements. It also works very well when all (or nearly all) columns of a table are returned by a scan. One such Scan Engine is described in U.S. patent application Ser. No. 10/667,128, now published as U.S. Patent Publication No. 2004-0205110, filed Sep. 18, 2003, entitled "Asymmetric Data Streaming Architecture Having Autonomous and Asynchronous Job Processing Unit", assigned to Netezza Corporation, and which is hereby incorporated by reference.

The limitations of horizontal storage become more apparent when a scan returns only a small subset of a table's columns. This reduces the density of useful data in the Input/Output (I/O) stack and causes cache-unfriendly access patterns as the few desired columns are retrieved from the dross that is the balance of each row. The cost of delivering so much data into memory is mirrored by a concomitant cost of reading all of that data off the disk.

By eliminating columns that are not part of the desired projection before they ever reach memory, such a Scan Engine addresses the first of these performance problems. It is, however, unable to do anything for the large number of uninteresting columns that still must pass under the disk head. Thus, the presence within a horizontal representation of columns that are not being returned by the scan limits the rate at which requested, interesting data becomes available to the Scan Engine.

From a compression perspective, the simplest way to view horizontal rows in table storage is as a single stream of bytes. One can then imagine applying to that stream any of the many well-know lossless byte string compressors: zip, bz2, lzw, etc. Unfortunately, database rows typically do not compress well, except with the most aggressive, computationally costly of these compression schemes.

The reason is that these compressors look for repeated sequences of bytes. A given sequence of bytes in one column just might, incidentally, be repeated in a different column. If that sequence actually does reoccur within the byte stream there is a much greater likelihood that it will be at a boundary corresponding to another field within the original column. This is because values within the same column are much more highly correlated than values which, though nearer in the serialized horizontal byte stream, actually come from other columns.

Even with a focus narrowed to a single column the correlation between values might not be identified/exploited by a compressor that viewed input as an opaque string of bytes. Binary data may have to be interpreted to find compression opportunities. For example, consider the pair of 16-bit numbers 0x00fb and 0x0102. Each is two bytes long, they share no bytes in common, and yet the difference between these numbers is |7|. Even allowing for a sign bit, such a difference can be encoded in 4 bits or ½ a byte.

1.2. Byte-String Oriented Compression and Scan Engines

Classic horizontal compression algorithms are particularly inimical to hardware based Scan Engines. These algorithms require some form of dictionary data structure and at least moderate amounts of storage to implement both that dictionary and a decompression window. The algorithmic complexity might not be beyond the realm of the implementable, but the Scan Engine memory resources would permit only very small dictionaries and windows, further reducing compression effectiveness. Finally, it is hard to imagine that, within the constraints of the available on-chip resources and clock frequency, any implementation of a classic dictionary-based decompression algorithm is possible that could come anywhere close to keeping up with the disk input data-rate or even satisfy the input bandwidth of the Scan Engine's filter section. The net effect of implementing a classic horizontal compression scheme would be to accept a compromise in which compression improves storage efficiency, but reduces system performance.

1.3. Vertically Partitioned Storage, Scanning and Projection

Systems using row-based storage have developed many techniques to improve query performance. At least one of these is in the use of Materialized Views, as described in U.S. patent application Ser. No. 10/667,128 filed Sep. 18, 2003 and assigned to Netezza Corporation.

Other systems have attacked the problem at its root by moving from horizontal, row-oriented storage to vertically partitioned storage. In this approach, shown in FIG. 1, a logical row within a table is not stored as a physical row within one storage container. Instead an N-column table is represented as N distinct storage containers, one for each column in the table. The N fields of each logical row are spread across the N storage containers. This permits each per-column container to be compressed independent of the others.

The implications of such an approach are numerous. Many are negative: larger minimum footprint for the smallest table, much more complex data flow when loading rows into tables, and multi-way merge-join to reassemble rows during scans, just to name three.

Of course there are also beneficial implications. Because each column is relegated to a separate container a vertically partitioned implementation quite naturally avoids reading data not germane to a given scan. When a scan retrieves only a small fraction of a table's columns, only these columns need to be decompressed.

1.5. A Compiled Table Algorithm Approach

By combining vertical compression with horizontal row storage and storing data not as values but as compiled instructions to generate the values, one obtains an improvement over other schemes. This approach, called a Compiled Table Algorithm, or CTA, herein is a vertical compression scheme that operates with knowledge of column values from adjacent rows. In contrast, horizontal compression algorithms operate on data as a byte stream. One of the benefits of vertical compression is that data within any given column in adjacent rows is often the same or closely related; it is relatively space-efficient to say "same as previous" or "add one." This benefit has two associated costs. First, since a compressed field depends on the previous field, there is no random access within the compressed bit stream. In general, even if one can identify the bits that encode the value of a given field it is impossible to know the actual value without knowledge of the value of the corresponding field in an earlier record. This chain of indirection/uncertainty is terminated only by the well-defined boundary state at the beginning of each compressed page. The second cost is an absence of in-place overwriting. The number of bits required to encode a given field and its successor in the next record is a function of how closely those values fit into previously identified patterns within that column. Thus, even a small change to the value in a field will likely require a different number of bits to express that field. Further, changing a field alters the context within which the values in that column in subsequent records will be encoded.

As with any compression algorithm, there are two parts to application of the CTA: how the data is compressed and how the data is decompressed. The Compiled Table Algorithm is called compiled because the compressed form of the data is a set of instructions used to reconstruct the original data. So the compression process compiles instructions and the decompression process executes those instructions.

The execution process has two parts, corresponding to two of the major sections headings of this document.
1. The execution machinery and state maintenance.
2. The instruction set and its operand encodings.

The CTA was designed with a pipelined implementation of decompression envisioned as a frontend within a Field Programable Gate Array (FPGA) implementation of a Scan Engine. The CTA instruction set can be extended upward-compatibly over time. Important constraints on such extensions would be a compatible decoding scheme and dataflow that could be accommodated by comfortable enhancements to the current pipeline (such as to support character strings).

As shown in FIG. 2, source data rows are burst in per-column-field-stream and then compiled independently of each other. The field instructions are generated by a software-based compiler in one embodiment. Instructions for reconstituting each field, which may be bit granular, may depend on a history of previous values and may have other characteristics as more particularly described herein. The field instructions are then assembled into variable sized compressed rows.

The compressed rows are then forwarded to the database storage device(s), such as one or more disks. The disk storage preserves all significant structural properties of the uncompressed data while taking up much less space.

On a scan operation, the data and/or instructions in the compressed rows are read back from the disk and burst into the constituent field instructions for each stream. This step can be typically performed by the FPGA or other portions of a Scan Engine. The field instructions are then executed to recover the full size data values. The field values are then reassembled to recover the original uncompressed rows. The FPGA can then perform, as in the prior art, following database scan related operations such as restrict, project or other operations to return only the desired rows and columns.

It is thus understood that a key feature of the compression technique is that it treats compression as a process of compilation, generating a set of instructions that are determined by a compression processor (compiler) operating on original data fields. Compression results from the fact that, on average, the number of bits needed to encode an instruction and any argument(s) is less than the size of the original data field. The instruction stream thus represents an abstract decompression processor. The instructions are stored in the database as column data that, when read from the database and executed as a sequence of instructions by a decompression processor (scan engine), reconstruct he decompressed form of the original data. The decompression processor is amenable to efficient implementation in various forms of hardware such as an FPGA, gate array or special purpose programmed data processor.

The technique has several advantages including reducing disk storage required for a given data set and improving database performance by reducing the amount of data written to and read from the disk.

The constituent field instructions, being the output of a compiler and being input to a scan engine, may take any of a number of advantageous forms. For example, in their simplest form the instructions may be to repeat the same data value as read from the corresponding column in the immediately previous row; or add a constant value such as "1" to the previous value, or to generate the next term in a mathematical series.

Similar instructions may be to pass through a presented raw data value—such an instruction for example is typically required set the initial field value for the first row in a page.

Further embodiments may allow an instruction for a particular field to determine the constituent value based on an operation with the field value produced by another column instruction. For example, in a transaction database, one column may represent a total cost value, which is determined by multiplying a first column having a quantity value times a second column having a unit price.

In further embodiments, the column instruction may be to present a null, or empty, or blank value.

Further embellishments to the fundamental concept may provide for instructions that are tailored to the specific data types that are being compiled. For example, in the case of representing variable length character strings, such strings typically have two constituent parts, including a length value and an ascii text string component. The architecture of the CTA permits encoding a column of variable character strings such that the integer length values are encoded as one column that are separately encoded from the text strings, which are represented in a separate way that is most efficient for text data. This provides the flexibility of using different compression algorithms for encoding the lengths than those compression algorithms used for compressing the text strings, resulting in further efficiencies.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a table illustrating an example compression state.

FIG. 9 is a table illustrating delta argument bit-widths that may be provided per supported scalar column width in bytes.

FIG. 10 is a table indicating stack behaviors by locator.

FIG. 11 is a table of locator encodings.

FIG. 12 is a table of Field Reconstruction Operation (FRO) semantics.

FIG. 13 is a table of 3 bit FROs.

DETAILED DESCRIPTION OF A PREFERRED EMBODIMENT

2.0. Preferred Embodiment 2.1 System Architecture

Figure 1:
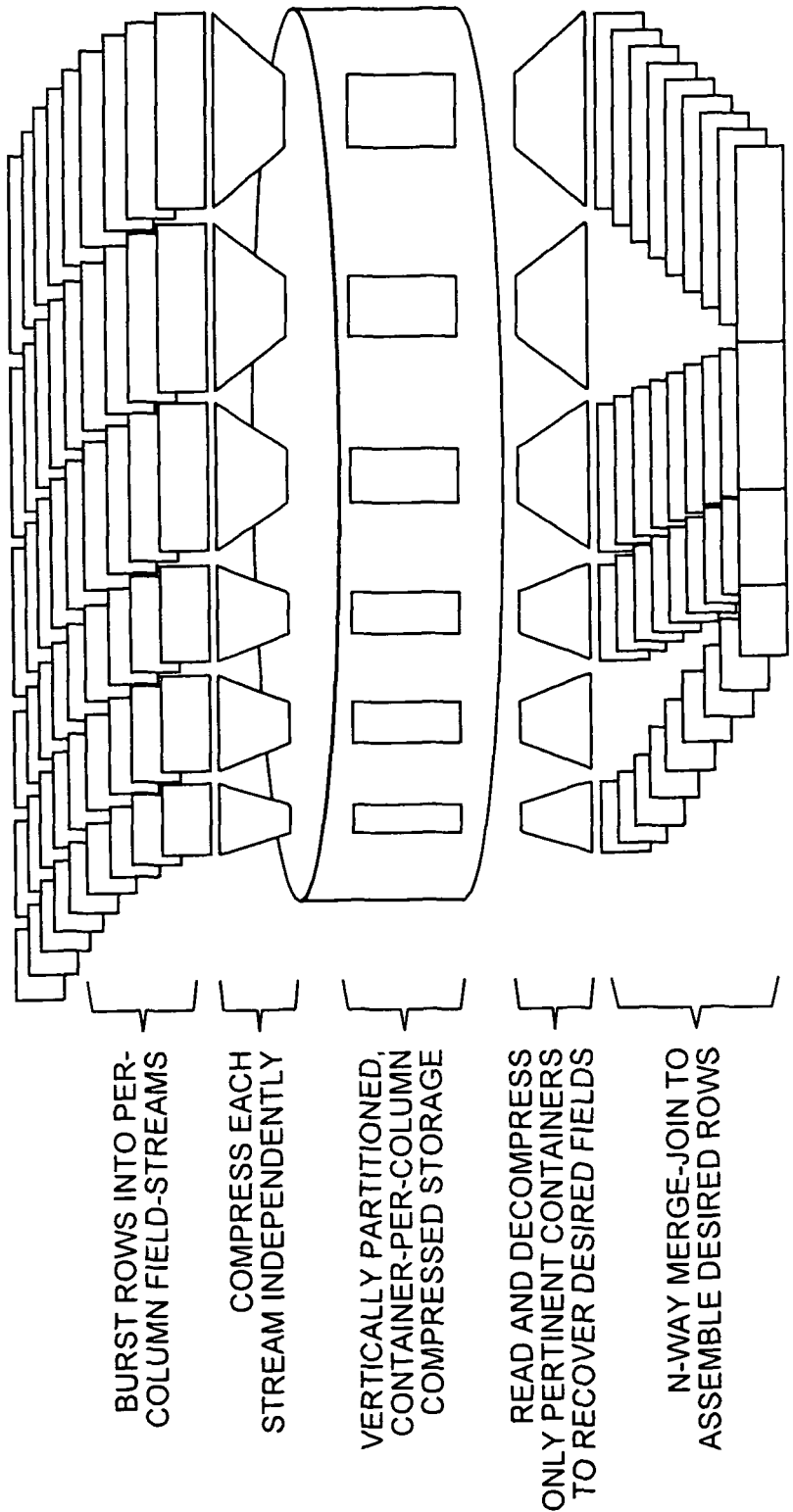
FIG. 1 is a high level diagram of a prior art system in which database rows are burst into per column fields that may be compressed independently.
Figure 2:
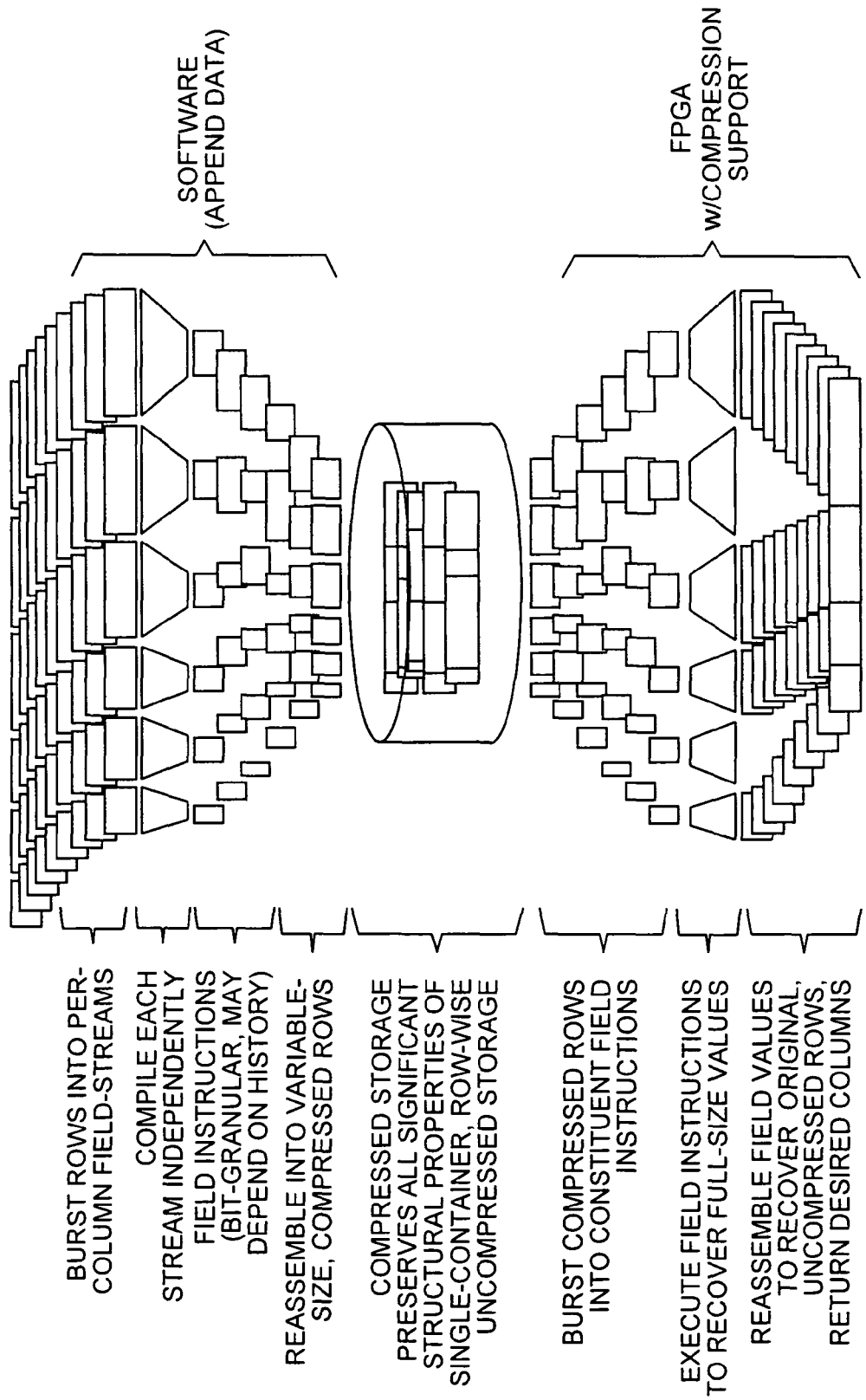
FIG. 2 is a high level conceptual diagram of operations and a flow chart of method steps used to provide a compiled table algorithm according to the present invention wherein column field streams are compiled to provide field instructions and the field instructions are then executed to recover data values.
Figure 3:
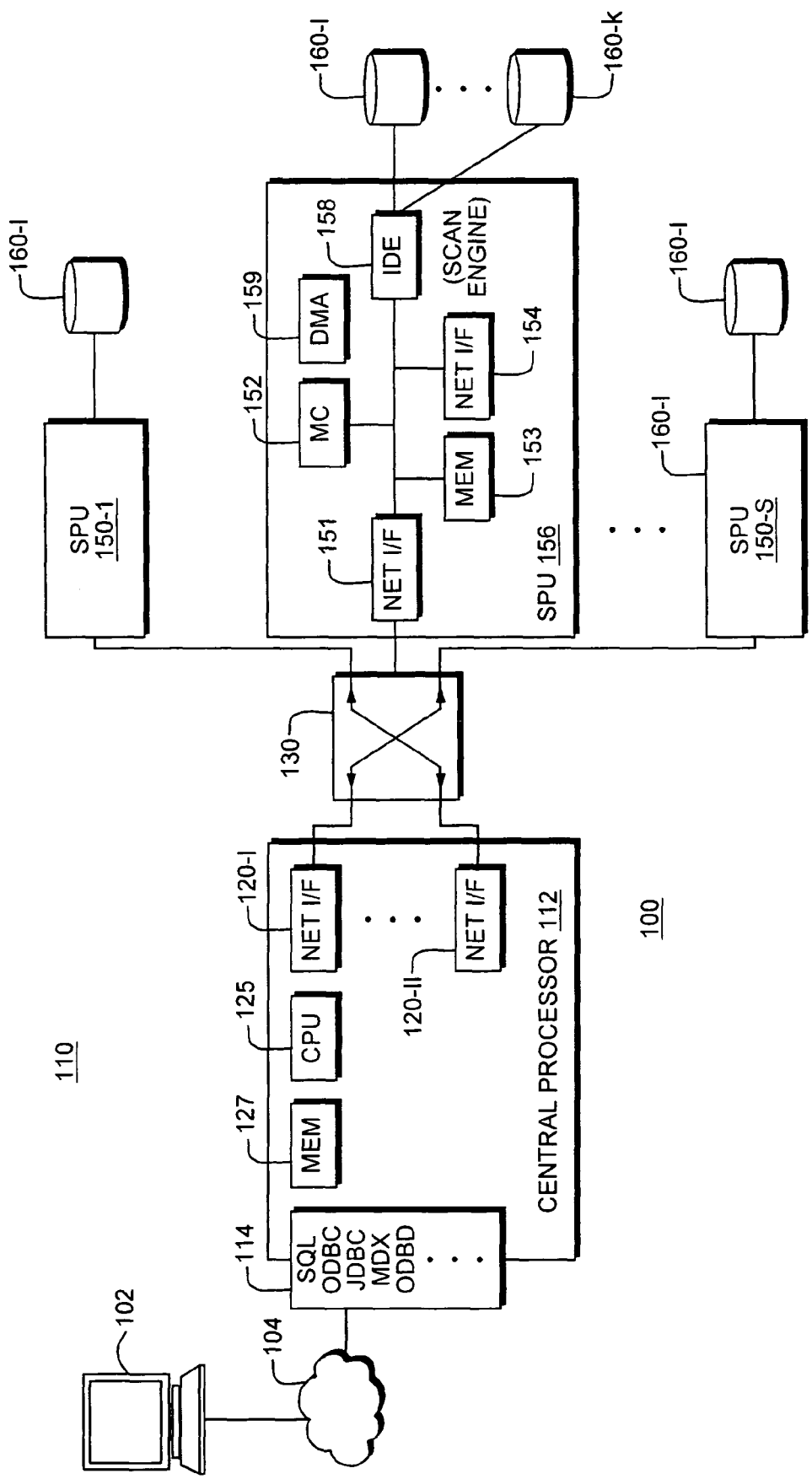
FIG. 3 is a hardware diagram of an example system architecture in which the compiled table algorithm may be implemented in a Snippet Processing Unit (SPU) and Field Programmable Gate Array (FPGA).

The invention's preferred implementation can be in a parallel relational database system 100 as shown in FIG. 3, where embedded processors 150, acting as intelligent disks, communicate through a hierarchical communications fabric 130 to one or more processors 110 (called the 'hosts') at the root of the communications hierarchy.

Each of the embedded processors (also called 'Snippet Processing Units' or 'SPUs' herein) 150 consists of a one or more mass storage devices such as magnetic disk drives 160, a communications fabric interface 151, a micro controller (MC) 152 serving as a central processing unit (CPU), random access (RAM) memory 153, and other circuitry required to connect these elements, provide electrical power, and the like.

2.2. Component Detail

As more particularly shown in FIG. 3, a typical host may consist of one or more individual SMP "host" computers 110, each with its own memory 127, network interface 120, central processor unit (CPU) 125 and local storage (not shown in FIG. 3). Each host 110 runs its own operating system, and typically, but not necessarily, each host 110 uses the same type of operating system as the other hosts 110.

The hosts 110 typically accept queries that are requests for data stored on mass storage devices, such as hard disk drives 160. The requests may originate as queries from any number of software applications, typically business intelligence applications, that may be residing on local processors (e.g., client computers 102) or separately running application software. The requests may originate through a computer network 104 or local to the hosts 110. Queries are typically provided in a format such as Structured Query Language (SQL), Open DataBase Connectivity (ODBC), Java DataBase Connectivity (JDBC), or the like.

The hosts 110 accept queries that can retrieve, modify, create and/or delete data stored on disks 160 and the schema for such data. The hosts 110 also accept requests to start, commit, and rollback transactions against the data. The hosts 110 also perform typical administrative functions such as reporting on the status of the system 10, start and shutdown operation, backing up the current state of the data, restoring previous states of the data, replicating the data, and performing maintenance operations.

A catalog management component (not shown in FIG. 3) contains descriptions of the columns and layout of data. Catalog management also contains information about which users 102 (e.g., which applications) have which permissions to operate in which ways on which types of records, datasets, and relations. The various hosts 110 interact with catalog management in order to process the requests they receive. In one embodiment, the catalog management is embedded within one of the hosts 110, with parts replicated to the other hosts 110 and second group (150) components. As will be understood shortly, the catalog manager is used to provide information to permit the components of the second group 150 to perform record filtering and other database functions.

Each SPU 150 consists of a network interface 151 for receiving requests and delivering replies, a general purpose Central Processing Unit (CPU) such as a Micro Controller (MC) or microprocessor 152, memory 153, direct memory access (DMA) controller 159 and a Programmable Streaming Record Processor (PSDP) (also called a Scan Engine herein) implemented in a Field Programmable Gate Access (FPGA) 154. Each SPU 150 runs a multi-tasking, schedule-based operating system. Each SPU 150 also has an at least one attached disk 160 and disk controller 158 from which the SPU 150 may read streaming data. In other In some embodiments, the SPU 150 can receive streaming record data from alternate or additional sources such as other on-board processors or via other network interfaces in place of the disk drives 160.

The SPU 150 accepts and responds to requests from host computers 110 to process the streaming, record-oriented data under its control. These requests are typically "jobs" of a larger SQL query, and are expressed as sequences of primitive operations on an input stream. The primitive operations could be interpreted, but in the preferred embodiment, they are packaged as compiled code that is ready for execution. An exemplary job-based query is described in more detail below.

In addition to processing jobs, a SPU 150 also accepts and responds to requests from hosts for other operations such as:
Start, pre-commit, commit, abort, and recover transactions
Perform mirroring or other replication operations
Start, initialize, reinitialize, stop, and retrieve status information
Create, modify, or delete descriptions of records, indices, views and other metadata.

SPU(s) 150 typically use a multi-tasking Operating System (OS) to allow receiving, processing, and reporting the results from multiple jobs in a job queue. In the preferred embodiment, the OS should also support overlapping job execution. To coordinate this, the OS typically is responsible for scheduling and prioritizing requests according to a number of factors that are determined in real time. These may include a job priority as assigned by the user and/or host 110, as well as a job's expected impact on the SPU's 150 local resources includes the amount of memory, disk, network, and/or I/O queues needed to complete the job. The SPU 150 can also contain software for performing concurrency control, transaction management, recovery and replication of data for which the SPU is responsible.

In the preferred embodiment, SPUs 150 are not directly visible or accessible to the users of, or the applications that run on, for example, the external clients 102 that present queries to the system 100. The SPUs 150 are embedded components and maintain significant autonomy and control over their data.

As now understood from the above architecture discussion, in a preferred embodiment the database is a parallel database whereby a given user-supplied SQL query may be simultaneously executed on some or all of multiple SPUs 150. Specifically, the SQL is broken into component pieces (called 'snippets') that the SPUs 150 execute on their portion of the total data system.

Throughout the system, the components and sub-components are designed to optimize performance through extensive use of streaming operations on "tuple sets", or rows of a database table. As will be understood shortly, most operations are designed to take tuple sets (records or groups of records) as their input and output streams; these operations try not to materialize data, but instead they stream the output to the next operation. As a consequence many operations can be handled as one continuous data flow, whereas in a conventional system, it would be necessary to handle them in various layers.

The result is that the input data is read and transformed in a streaming fashion and converted to network-ready tuple sets packets at streaming speed with minimal overhead.

In an example scan operation, the FPGA 154 filters records of interest and fields of interest within those records, and places the resulting tuples into a tuple set buffer in SPU memory 153. As each tuple set buffer is filled, it is placed in the SPU network packet I/F 151 output buffer associated with the requesting host 110. When a network packet output buffer in the SPU 150 is filled, its contents are sent to the host 110.

2.3. Basic Architecture of the Scan Engine

Figure 4:
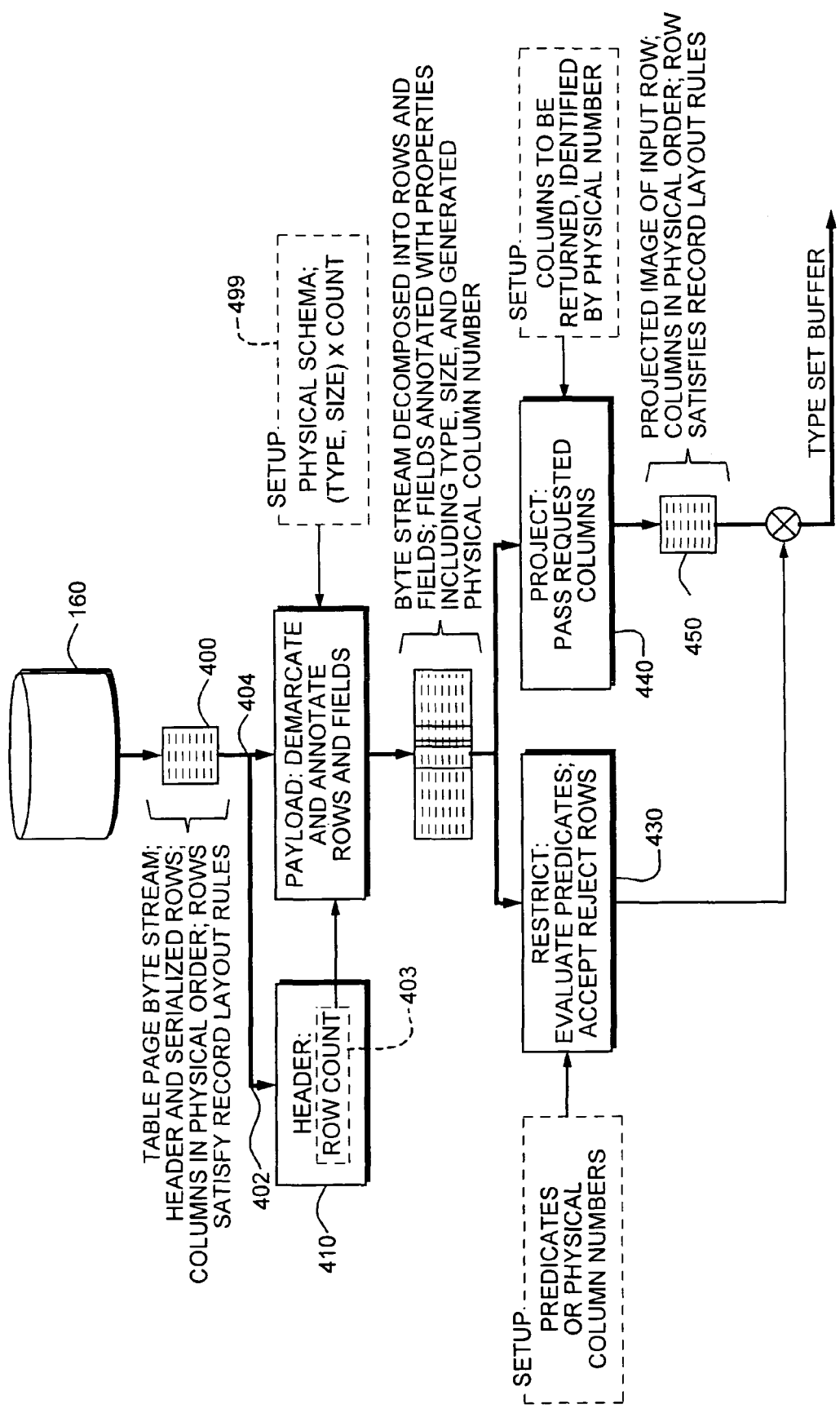
FIG. 4 is a process diagram of a prior art technique for a scan engine to reproduce projected images of database rows.

FIG. 4 illustrates a basic flow diagram of a record scan operation performed by the FPGA/Scan Engine 154 prior to addition of support for decompression.

The fundamental role of the Scan Engine 154 is to identify table rows satisfying a given set of conditions and to return a defined subset of the columns as records conforming to the layout rules as specified by a catalog manager (in processor 110).

As shown in FIG. 4, a table page is streamed off disk 160 as a byte stream 400. The table page includes both a header 402 and a payload of serialized row data 404 with columns in physical order. The rows satisfy column ordering rules as specified by the catalog manager mentioned above.

In a next step 410, the header 402 is examined to determine a row count 403. Within the resulting byte granular payload 404 operation 420, using the externally supplied physical schema (extracted from the database catalog) 499, identifies rows and demarcates the fields within each row. Fields may be also annotated with properties including the type, size, and a generated physical column number in this step. This permits separation of each field from the stream 400.

Next, a restrict 430 and/or project 440 operation are performed. Set up for the restrict 430 can include predicates for how to determine which rows to accept or reject fields, such as based on their physical column numbers. The project operation 440 is furthermore set up such that columns to be returned are identified by physical column number. The result of the restrict/project operation(s) is a projected image 450 of an input row with all columns still in physical order. The desired rows may then be placed in tuple set buffer, such as may be part of the memory 153 of SPU 150.

2.4. Extending the Scan Engine to Support Decompression

Figure 5A:
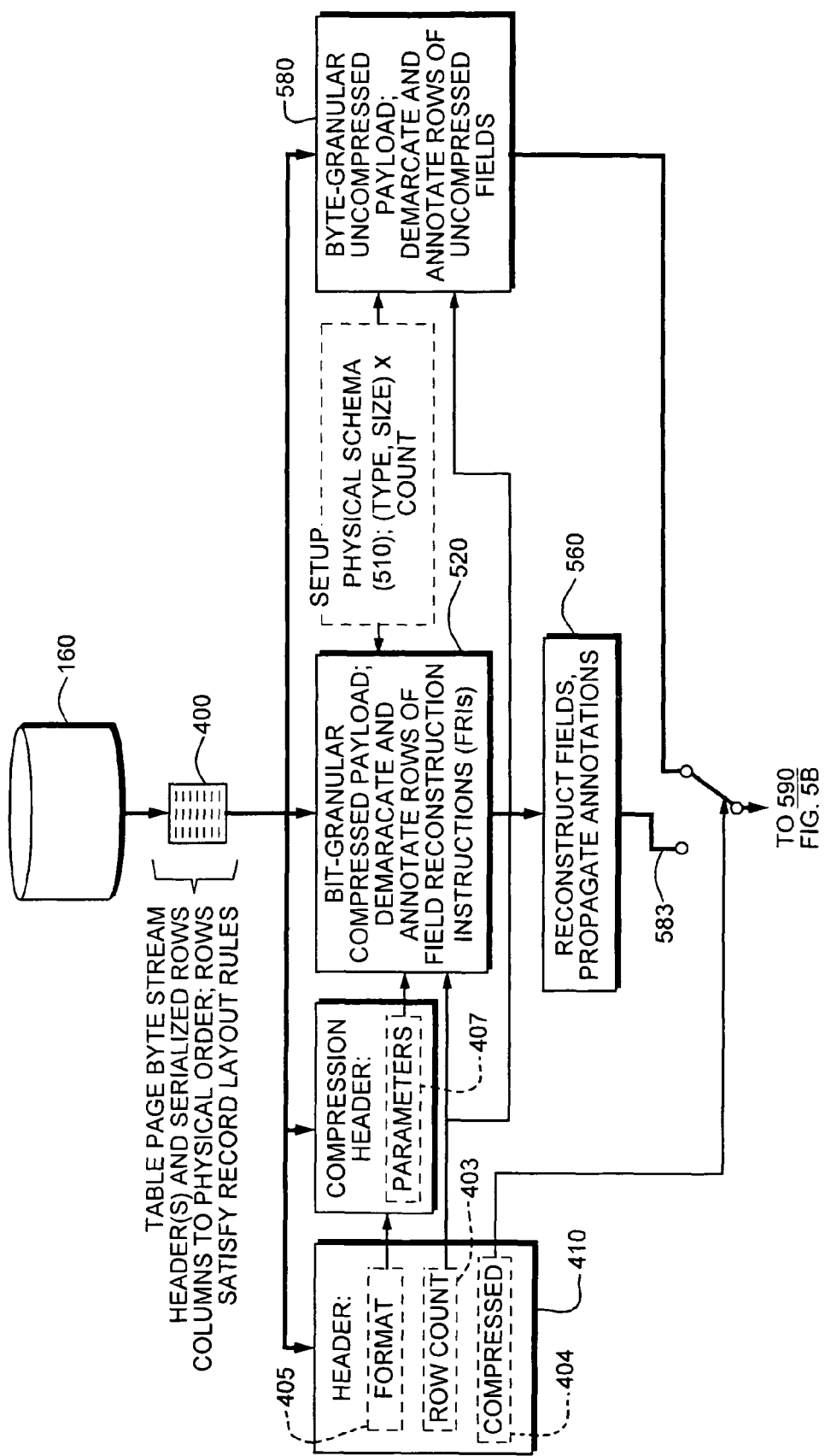
FIGS. 5A and 5B are process diagrams showing the scan engine as modified to support the CTA.
Figure 5B:
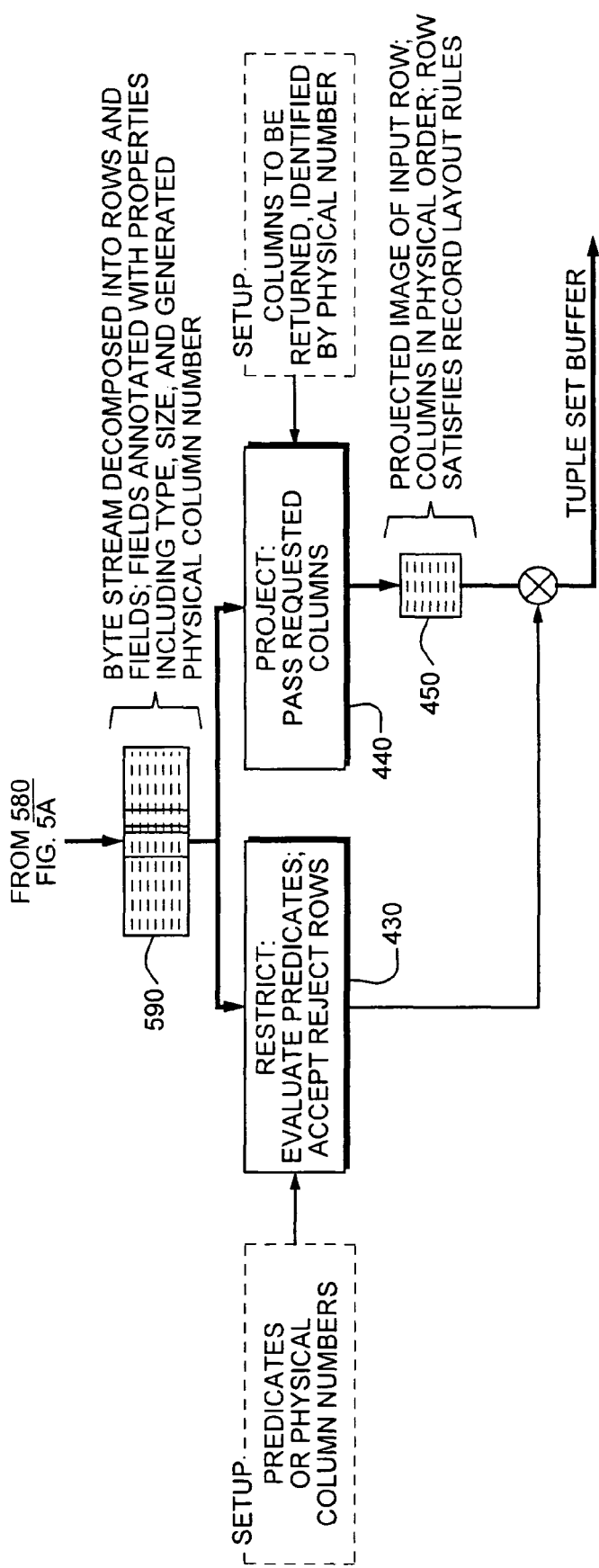

FIGS. 5A and 5B are detailed flow diagrams of the process carried out by the scan engine 154 to support decompression of data that is a stream of instructions that, when executed by the scan engine, generate the decompressed form of the data.

Similar to the example of FIG. 4, table page data is streamed off the disk 160 as a byte stream 400. The table page includes one or more headers 410 and serialized rows with the columns in physical order. The rows will also satisfy column ordering rules as defined by the catalog manager (in host 110). However, a number of different steps next take place. In particular, the header 410 of the table page includes not only a row count information 403, but also additional information including, for example, a compressed flag 404 indicating whether the row data is compressed or not, and if compressed then a compression format 405. The format information enables retrieval of parameters 407 from the compression header 410. These parameters 407 express, column-by-column: 1) a locator schema and physical encoding (e.g., FIG. 11); 2) an operation vocabulary and physical encoding (e.g., FIG. 13); and 3) the bit width of any deltas referenced in that vocabulary (e.g., FIG. 9).

Within the resulting payload, now treated as bit granular, operation 520, using the externally supplied physical schema (extracted from the catalog) 499 and the parameters 407 from the compression header 410, identifies rows and demarcates non-overlapping bit sequences corresponding to field reconstruction instructions (FRIs). At this point, one preferred embodiment implements an optimization termed "early projection". That is, by knowing the set of columns referenced downstream within the project and restrict processes, demarcation can avoid useless downstream reconstruction effort simply by not passing along unreferenced FRIs. Demarcation annotates each FRI that it does intend to pass along with properties including the type, reconstructed size, and a generated physical column number.

As FIGS. 5A and 5B show, the information from the physical schema 499 is then broadcast to both the bit-oriented compressed payload parser 520 and the byte oriented uncompressed payload parser 530, independent of whether the current page is compressed or not. Both parsers 520, 530 exploit the same information. In addition, the byte granular, uncompressed payload, if the compressed flag indicates as such, will be forwarded by 530 to allow for demarcation and annotation of rows of uncompressed fields in the same manner shown in FIG. 4.

If the payload indicates that it has been compressed, then it is fed to the process labeled "Reconstruct fields, propagate annotations" 560. This is where FRI execution occurs and thereby decompression. The end result is a byte stream 580 decompressed into rows and fields with the fields annotated with properties, including the type, size, any generated physical column number.

From that, further steps of restrict 430 or project 440 can be performed on the selected stream 590. The selected stream 590 is selected from the output of either the bit-granular, compressed payload process 560 or the byte-granular uncompressed payload process 530 (as determined by the compressed flag 404). The selected stream 590 is then further processed in the same manner as in the latter part of FIG. 4, where the projected image of an input row, with columns in physical order and with the rows satisfying record layout rules as specified by the catalog can then be stored in the SPU memory 153.

While FIGS. 5A and 5B illustrate an architecture where the Scan Engine is physically interspersed between a disk 160 and a tuple set buffer memory, in other embodiments there might be sufficient memory bandwidth for different architectures that achieve the same end. For example, to compressed memory pages could be placed into a memory buffer as an initial step. The Scan Engine could then read the compressed data from the memory buffer, perform the processing indicated (520, 560, 430, and/or 440), and then return the results to a tuple set for further software processing.

2.5. Compressed Pages, Uncompressed Pages, Endianess and Varchar Lengths

The following is a more detailed discussion of disk page and table data formats.

A page header preferably prefixes all disk pages containing table data. A payload of table rows follows the header. The Scan Engine 154 interprets both the header and the payload. In one embodiment, the table data is represented on disk using "big-endian" representation.

Compressed pages can include the same page header. This will allow rollout of new compression capability to customers with preexisting uncompressed datasets. Architectural layering argues strongly for a design in which the page header can be interpreted before knowing whether the subsequent payload is compressed or not. Thus, except for the introduction of a Compressed flag, the format of a page header can remain unchanged from the implementation of FIG. 4. In particular the page header can continue to use big-endian representation.

Disk pages whose Compressed flag is 0 or "false" are termed "uncompressed". By design this can cover data in at all existing installations. In one particular embodiment varchar length can include themselves (i.e. the empty string can be represented by a 2-byte varchar length word containing the value 2).

Disk pages whose Compressed flag is 1 or "true" are termed compressed. Design of the decompression pipeline of FIGS. 5A and 5B can be simplified if at least certain portions of the compressed bit stream arrive in little-endian order. Thus compressed payloads can use a little-endian on-disk format. The decompression pipeline can be further simplified by changing the interpretation of varchar lengths so that they no longer include themselves (i.e. the empty string can be represented by a 2-byte varchar length word containing the value 0).

It is easy to also imagine little-endian FPGA record filter and project sections. Equivalently, the FPGA filter and project sections can also run big-endian with a conversion to little-endian byte order occurring near the output FIFO. By contrast, carry propagation during field reconstruction argues strongly for using a little-endian representation for compressed payloads. In a preferred implementation one would use little-endian representation for both compressed and uncompressed payloads. This would eliminate the need to reconcile two schemes at the point where the two parsers converge. Further, the SPU itself could use little-endian representation. This would eliminate any issues as the FPGA sends data to memory and, by matching the "endianness" of the host, eliminate byte swapping during marshalling and unmarshalling of communications packets exchanged with the host.

In one embodiment, further header fields can specify still further page formats and/or payload encodings.

2.6 Compiled and Non-compiled Columns

The compression architecture uses multiple techniques to reduce the size of records on disk 160 relative to their canonical size in SPU memory 153. The general intent is to apply the CTA to every column to which it is applicable. The vision is that, over time, a CTA compiler can become richer, more expressive, and more adaptive, able to exploit wider ranges of redundancy and broader ranges of data types.

The CTA encode decision is made on a column-by-column basis. A column that has been CTA encoded is called a compiled column, and informally a field within such a column is called a "compiled field".

For any number of reasons—including architectural choice,—a particular column may not be encoded by the CTA. Such a column is called a non-compiled column, and a field within such a column is called a non-compiled field. The null/non-null state of non-compiled fields is conveyed out of line (see section 2.7). The encoded representation of a non-null, non-compiled field uses the same number of bits as would have been used to represent that field on an uncompressed page. Single byte integers, fixed length strings and varchar bodies are represented without change. Multi-byte scalars and varchar lengths are represented in little endian-order. Varchar lengths are expressed as the number of bytes in the varchar's body (and hence do not include the bias of +2 to cover the length itself).

Some database primitives depend on being able to update a DTID (Deleter Transaction ID) in-place. This requirement can be accommodated by representing the DTID as a non-compiled column. Thus a DTID on disk always occupies exactly the same number of bits irrespective of its actual value. Further, the representation of any particular DTID depends in no way on any earlier DTID. This is a policy decision and is not hardwired into the FPGA. This representation of the DTID "in the raw" is conveyed through the general mechanism of the non-compiled column bit vector.

In one embodiment which columns are compiled and which are not is provided as part of the catalog specification; in other embodiments, this can be determined by the compiler.

2.7. Representation of Null

For a compiled column, there exists within the compressed schema no analog of an associated null bit within a null vector. If a particular compiled field is null that fact is captured directly within the field's compiled encoding.

The same technique is not available to non-compiled columns. Instead one can use a null vector mechanism: the non-compiled-user-columns-null-vector (NCUCNV). An NCUCNV includes one bit for each non-compiled user column. The presence or absence of an NCUCNV is a property of the compressed schema, conveyed to the FPGA at setup. A compressed schema includes an NCUCNV only when there is at least one (1) non-compiled user column.

Unlike the traditional uncompress null vector the NCUCNV contains no bits for compiled columns, it is not byte-granular (hence is not rounded up to a multiple of 8) and includes no padding (though padding may be materialized during record reconstruction).

2.8. Compiled Columns

Figure 6:
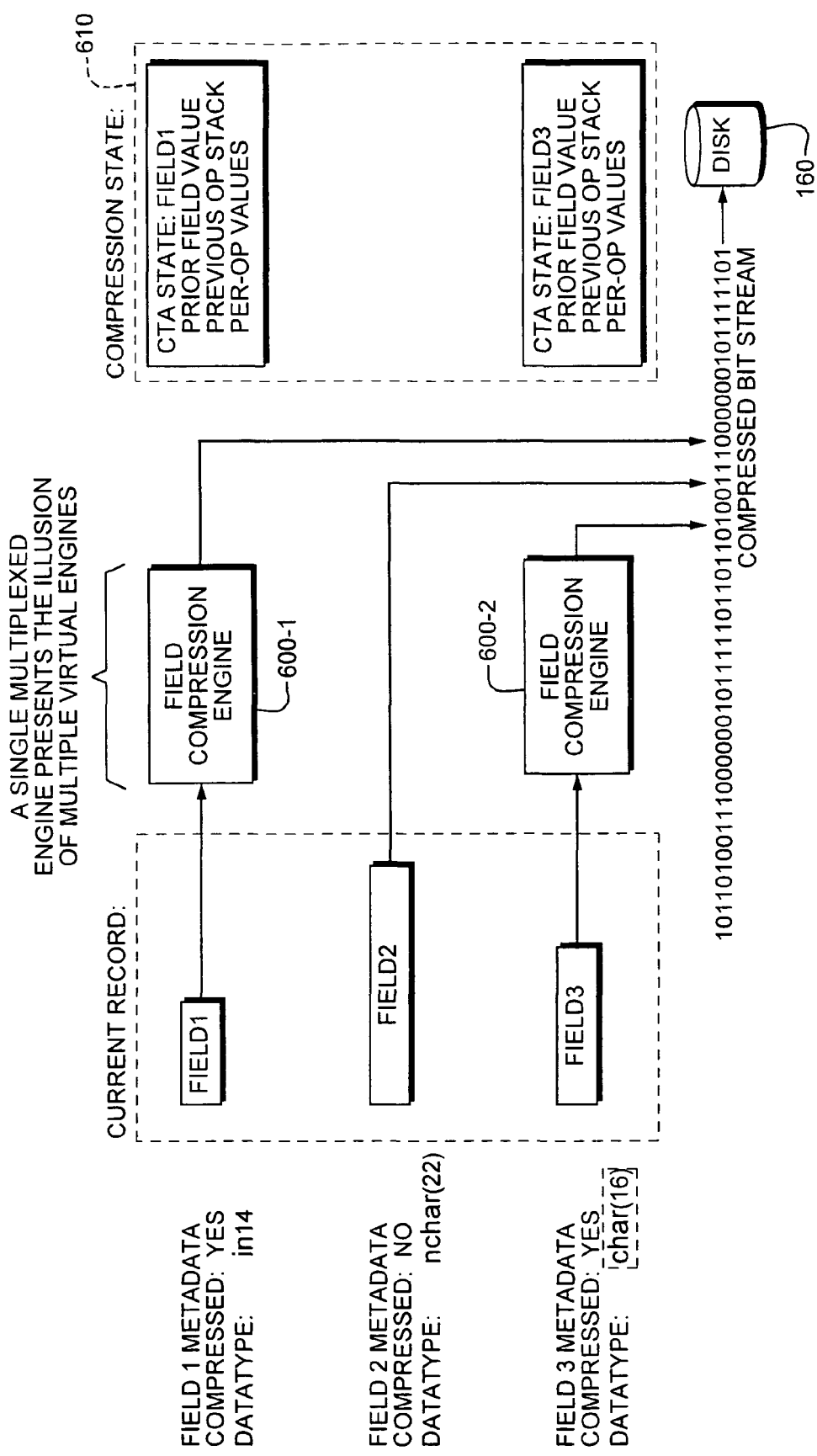
FIG. 6 is a diagram illustrating how a database record is processed by a compression engine (complier) to produce a compressed bit stream.

As explained above, CTA operates by column. As a record is encoded or reconstructed, each column is processed separately. If the column's metadata indicates that it is compiled, then it is processed by a unique instance of a field (compilation or reconstruction) engine. This association of state and metadata is shown in FIG. 6, which, illustrates Compression State, which the reader should note does not capture the null behavior of uncompressed fields.

The compressible fields can be determined statically at the time a table is defined and that choice is stored as part of the metadata. The determination depends on the specific hardware. For example, compression can have limits on the number of columns and their sizes that can be processed. When a table is created, the front-end 110 will set the column compression attribute based on the data type and size as well as the maximum number of compressed fields and compressed field bytes that are supported by the hardware of SPU 150. However, the compressible fields can also be determined dynamically.

When a column is compressible, an instance of Field Compression Engine 600-1 state 610 is allocated consisting of the last saved value of the column, the last delta used to construct or reconstruct a value of the column, and a stack of previously used compression operations that can be reused by reference in subsequent compression instructions. (Recall from the discussion above in one implementation, there may be multiple compression contexts running on a single and/or multiple compression engines.) The compression operations are referred to as Field Reconstruction Operations, or FROs, some of which have associated arguments.

FIG. 7 provides one example of how a compressed integer column might be compiled. The 'Saved' column is the value of the field from the prior record, and a 'Value' column is the value of the field for the current record, which will become the next 'Saved' value unless the result value is null or empty. Some of the work of the compilation is to minimize the size of the instructions. That is the motivation behind the Delta value; for runs of the same delta, the instruction only needs to encode an ADD.

The table of FIG. 7 illustrates an example compression state for a single column across 12 rows.

The compression process generates a bit stream without concern for alignment. Compressed fields and uncompressed fields are jammed together without intervening space. Further, compressed records are jammed together without intervening space, and a record boundary may be at some bit boundary in the middle of a byte.

Figure 8:
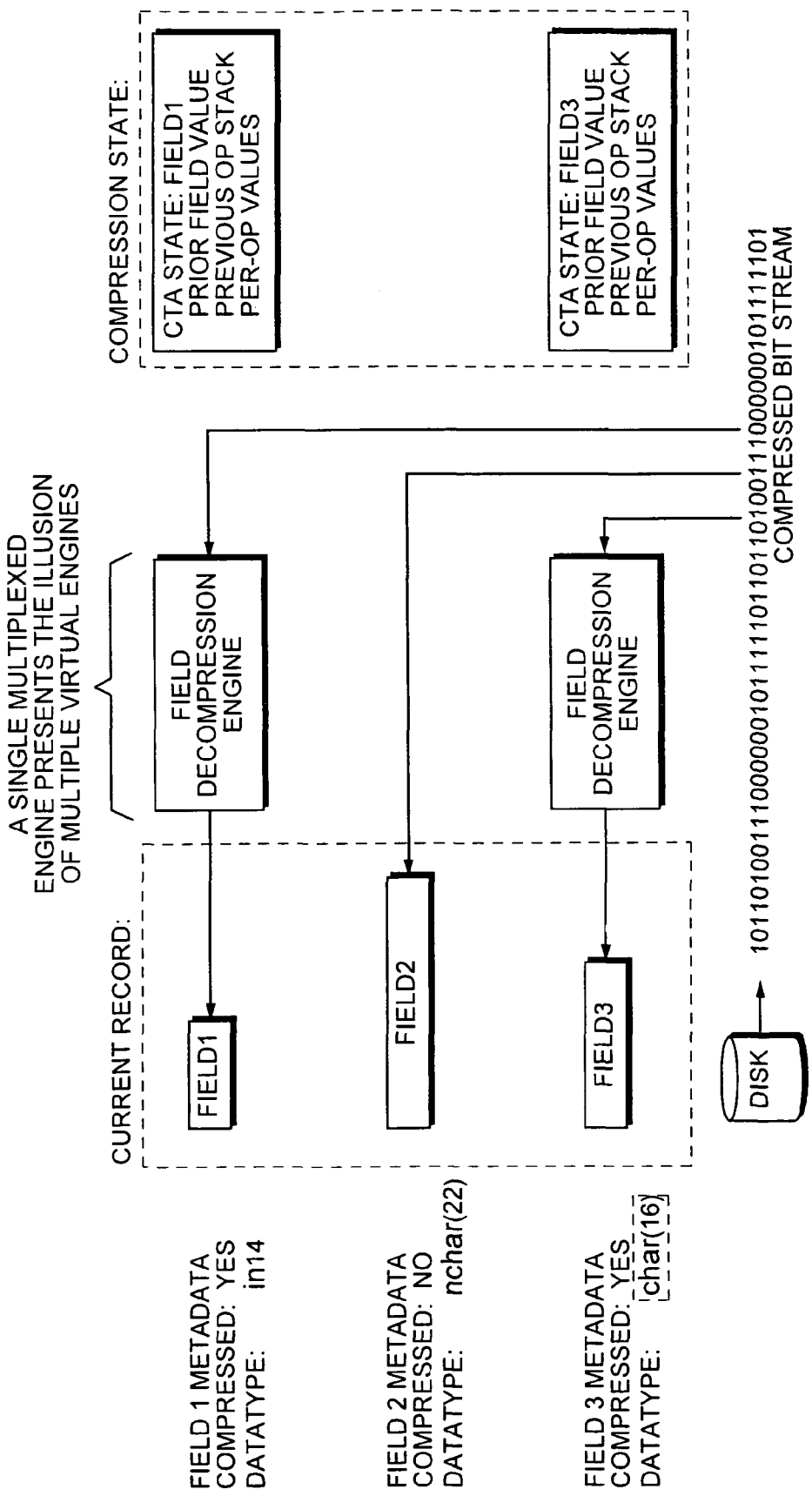
FIG. 8 is a diagram illustrating a process of decompression using a field decompression engine.

Decompression by a Field Decompression Engine uses a similar structure to compression, but rather than compiling the data into optimal compression instructions, it executes the instructions to generate the data. The multiple Field Decompression Engines in FIG. 8 are, in one embodiment, instantiated as multiple decompression contexts on only a single decompress engine. The illusion of multiple engines is created by multiplexing that single engine across those multiple contexts.

The flow is shown in FIG. 8.

3. Field Engine Control and State

3.1. Field Engine Control

For the most part, field engine state is cleared before beginning each new page of compressed data, and the information necessary to reconstruct field values is contained in the bit stream. One exception can be the definition of which delta argument widths will be supported for each data size. Delta widths can be hard-coded into individual instructions for each delta width—referring to the size of the field reconstruction argument and not the delta value represented therein—each defining a specific number of bits. However, in one embodiment, three generic "delta" operations can be defined, and the delta width of each depends on the size of the field being reconstructed.

A potential set of definitions is shown in FIG. 9, which is a table of Delta Argument Bits per FRO by Data Size. The can be adjusted based on further empirical work. No delta may be defined to need as many bits to express the delta as would be required to inline the uncompressed field data. Put another way, if the field size is N bits, the maximum delta argument size is N–1 bits. The delta argument size is referred to as deltaBits.

The deltaBits values can be stored in three new words at the end of the block header: Delta_A at address 0x20, Delta_B at 0x24, and Delta_C at 0x28. Whereas the rest of the block header is big-endian, the deltaBits can be defined little-endian from 1 byte up through 16 byte fields. Thus, to find the deltaBits definitions from a word of memory with the value of 0x0A0B0C0D, the bytes must first be rearranged to 0x0D0C0B0A, then the deltaBits will be ordered as {16B[6:0], 12B[6:0], 8B[5:0], 4B[4:0], 2B[2:0], 1B[1:0]}.

3.2. Field Engine State

This section documents the three possible types of state maintained, in one embodiment, in the Field (Compression or Decompression) Engine for each compressed record column: previously executed FROs (PEF), saved valued, and delta value.

3.2.1. PEF Stack

One observation made during development of the CTA is that instructions often repeat. That is, there often are runs of ADD, ADD, ADD, and ADD. To economize on instruction storage, the shortest instructions are used to refer to a per-column stack of Previously Executed FROs, or the PEF Stack.

In this embodiment, the PEF stack is three elements deep. This depth is a trade-off between the number of inline bits to refer to the element and the number of times compression is likely to use instructions deep in the stack. Three was selected based on empirical tests against customer data sets, but other sizes are possible. Each stack element contains previously executed FROs, but not their arguments.

Depending on the locator, there are several different possible stack behaviors, as shown in the table of FIG. 10.

3.2.2. Saved Value

The Field Engine for each compressed column has a saved value that records the value of the field from the previous record, unless the previous field was empty or null. At initialization time, the saved value is set to binary zeros.

3.2.3. Delta Value

The Field Engine for each compressed column maintains an integer delta value. For Add and Delta FROs, the existing or new delta value is added to the saved value to reconstruct the current field value (and update the saved value). On initialization, the delta value is set to binary zeros.

4. Instruction Set & Operand Encodings

This section documents the CTA instruction set for numbers: specials, numerics, integers, dates, times, floats, intervals, and timestamps. An instruction set for strings is possible, but not yet defined here.

4.1. Instruction Format

A "compressed" field is a single instruction that is executed to form a resulting data value. Each instruction has exactly one format and set of arguments.

An instruction can be thought of as having three parts:
1. Locator—used to locate the FRO.
2. FRO, or instruction opcode.
3. Optional argument.

The locator and any argument are always in the bit stream, or inline. The FRO may be inline or in the PEF stack.

4.1.1. Locators

A possible encoding for locators is shown in FIG. 11, and locator semantics are defined in FIG. 12.
PEF0 The FRO is located in the 0th index of the PEF stack
PEF1 The FRO is located in the 1st index of the PEF stack
PEF2 The FRO is located in the $2^{nd}$ index of the PER stack
INLINE The FRO starts in bit 2, immediately following the locator.

4.1.2. FRO Summary

A list of the 8, 3-bit FROs is provided in FIG. 13. Please see section 4.2 for definitions and semantics.

4.1.3. Argument Summary

With the enumeration of the table in FIG. 13, only the last 4 FROs have arguments. The FULL FRO indicates all bytes of the field are inline, which means the compressed representation will be larger than the uncompressed. Each DELTA FRO indicates a new delta value is located inline, and the number of bits used by the delta argument is determined by the field size as defined by the schema and the type of delta (A, B, or C).

4.2. FRO Definitions

A FRO reconstructs a field's value and the setting of its null flag.

This section provides the encoding and semantics for each FRO. The pseudo-code notation is as follows:

fro(argument)

Empty parentheses indicates that the FRO takes no argument.

The encoding of each FRO is presented in binary.

---
NULL
Syntax
    null( )
Semantics
    The field's null flag is set to 1.
    The reconstructed value is 0.
    There is no affect on the saved value.
Encoding
    Binary: 000
---

Rationale

SQL's data model requires supporting null values. NULL is the only FRO that sets a compiled field's null flag to 1 (TRUE).

While the reconstructed field in memory is set to zero (a preferred convention for a null field), the saved value is left unchanged. Since the EMPTY FRO can encode efficiently subsequent non-null zero values without reference to the saved value having NULL set saved value to 0 would produce no benefit. Further, in real world data streams nulls commonly interleave with non-null values; protecting the saved value preserves some context regarding the balance of the stream.

---
EMPTY
Syntax
    empty( )
Semantics
    The field's null flag is set to 0.
    The reconstructed value is 0.
    There is no affect on the saved value.
Encoding
    Binary: 001
---

Rationale

EMPTY expresses the value supplied by the loader when an input field is empty. Since this first CTA release will compile only number columns EMPTY, for now, can be taken to mean reconstruct the value zero. (EMPTY in the context of a char(n) column would mean reconstruct a field filled with spaces; EMPTY in the context of a varchar column would mean reconstruct a zero length field/string.)

While the reconstructed field in memory is set to zero the saved value is left unchanged. Using additional EMPTY FROs subsequent zero values can be encoded efficiently, without reference to the saved value. Further, in real world data streams zeros commonly interleave with non-zero value, often acting as pseudo-null values within non-nullable columns; protecting the saved value preserves context regarding the balance of the stream.

---
SAVED
Syntax
    saved( )
Semantics
    The field's null flag is set to 0.
    The reconstructed value is the saved value.
    There is no affect on the saved value.
Encoding
    Binary: 010
---

Rationale

SAVED captures runs of repeated, non-null, non-empty values. While the CTA has no run-length-encoding capability, SAVED in conjunction with the PEF[0] locator provides an ability to encode runs of an arbitrary repeated value with an incremental overhead of one bit per repeated occurrence.

---
ADD
Syntax
    add( )
Semantics
    The field's null flag is set to 0.
    Update the saved value by adding to it the recorded delta value.
    The reconstructed value is this new saved value.
Encoding
    Binary: 011
---

Rationale

A common data pattern within a column is a linear progression. ADD recovers that linear pattern using the saved value and the delta value. Since delta values are signed ADD can reconstruct both increasing and decreasing progressions.

---
DELTA_X
Syntax
    delta_a( delta )
    delta_b( delta )
    delta_c( delta )
Semantics
    The field's null flag is set to 0.
    deltaWidth is the - externally defined - width in bits of the FRO's delta argument.
    Extract deltaWidth bits from the bit stream. The least significant bit is the first bit read.
    Sign extend this value to the column's width by replicating the most significant bit (last bit read).
    Record this sign extended value as the delta value.
    Update the saved value by adding to it this newly recorded delta value.
    The reconstructed value is this new saved value.
Encodings
    Binary: 100    delta_a
    Binary: 101    delta_b
    Binary: 110    delta_c
---

Rationale

Delta encoding was the original inspiration for the CTA. It exploits the fact that when successive values in a column exhibit any instantaneous locality the difference between them is a delta encodable in fewer than a full column's width of bits. Overly wide columns represent an important, common instance of such locality.

From a total vocabulary of eight FROs, CTA allocates three to express delta reconstruction. All three behave similarly. Each retrieves a narrow delta value from the bit stream, sign-extends it to column width, stores it in delta value, and also adds it to the saved value. Each delta FRO is bound to a distinct argument width. These per column argument widths are referred to as A, B, and C. These widths are always greater than zero and less that the column's full width. E.g. the widths for an 8 bit/1 byte column fall between 1 and 7. A delta argument is a signed 2's-complement bit field. An argument of n bits can express deltas within the range [−2n−1 ... +2n−1−1]. Delta compilation is impossible when (valueToBeCompiled—saved value) cannot be expressed using the largest available delta width. In such cases, compilation devolves to FULL. When delta compilation is possible the availability of three delta widths offers compilation flexibility. An obvious compilation heuristic is to choose the narrowest width capable of expressing the delta.

One embodiment defines a number column full width to delta bits width map stored in the payload preamble of a compressed table page. This map contains three rows: A, B, and C; and six columns, one for each number (i.e. neither string nor varchar) width (1, 2, 4, 8, 12, and 16 bytes). Within the FPGA the width of a number column is always available. Given this map, determining deltaWidth is a simple two-dimensional lookup: the table walker's column width selects a triple (A, B, C) and the FRO selects a particular element from that triple.

One can enhance the mapping from a column to its triple (A, B, C) of delta bit widths. Each column can also have a distinct triple in every block.

---

FULL
Syntax
full( non-compiled value )
Semantics
   The field's null flag is set to 0.
   Extract the column's full width in bits from the bit stream. The least significant bit is the first bit read.
   Record this value as the saved value.
   The reconstructed value is this new saved value.
Encoding
   Binary: 111

---

Rationale

FULL is the most general encoding. It is used when none of the available delta widths provides sufficient range to encode the new value.

At a minimum, each use of FULL adds a locator to the bit stream. Hence the bit stream cost of a field compiled as FULL is always more than if the corresponding field occurred on an uncompressed table page.

5. Glossary

Argument An optional third component of a FRI (Field Reconstruction Instruction). Argument presence or absence is a function of the FRI's operation (FRO) irrespective of whether that FRO comes from the bit stream or the PEF stack. An argument always comes from the bit stream.

Column A vertical slice of a table. A column has a type. All values inserted into a column satisfy its type. Unless the column is declared as NOT NULL column values may also be null. On a compressed table page an important representational property of a column is whether or not it is values are stored in compiled form.

CTA Compiled Table Architecture, a technique for compressing table data on disk. A compiled field's value is reconstructed by executing a FRI.

DELTA FRO A compiled column's saved state includes a full column's width delta value. A DELTA FRO updates a compiled column's delta value using narrower signed argument retrieved from the bit stream. In one embodiment, FRO vocabulary includes three DELTA FROs, termed A, B, and C.

Delta Bits The size in bits of a Delta FRO's delta argument.

Delta Value The ADD FRO reconstructs the next value in a linear progression by adding the saved delta value to the column's saved value.

Field The intersection of a column and a row; an element of a record. On an uncompressed table page fields use the same representation as returned in memory.

Field Engine The term 'field engine' refers to the unique saved state that exists for every compressed field—PEF stack, value, and delta—in conjunction with the shared logic or circuits necessary to act on that state and a FRI to reconstruct a field value.

FRI A Field Reconstruction Instruction is the set of a locator, a FRO, and an optional FRO argument.

FRO A Field Reconstruction Operation, in conjunction with an optional argument, is a brief algorithm for reconstructing a field. The algorithm may reference two pieces of state: the saved value and the delta value, it may optionally update one of them. A FRO's exact interpretation is a function of the properties of the containing column and the disk page being reconstructed. This context sensitivity allows the vocabulary of eight FROs to be tuned on both a column and a page basis.

Inline Data retrieved from the compressed bit stream is said to be 'inline'; to be contrasted with data retrieved from a column's saved state (see PEF stack, Saved Value, and Delta Value).

Locator The leading component of a FRI. Locators always come from the bit stream. A locator is from 1 to 3 bits in length. It identifies the location of a FRI's operation (FRO) as either also inline in the bit stream or at a given position in the PEF stack.

Page A group of rows having columns (tables).

PEF stack The saved state for each compressed field includes the Previously Executed FRO Stack containing the 3 unique FROs that were most recently executed.

Record A synonym for row.

Row A horizontal slice of a table. A fundamental responsibility of the FPGA is to use the table descriptor and other schema information to extract rows from the on-disk bit stream and identify each rows separate fields.

Saved Value The saved state for each compressed field includes the field's most recent value.

Schema The sum total of all of the information needed to interpret the logical structure of a table.

Tuple A synonym for row. The term is used primarily within the FPGA design documents. The scope of the invention is intended to be encompassed only by the appended claims, and is not limited in any way by the specific examples given above.

What is claimed is:

1. A method for operating on a database, the database consisting of rows, the rows further subdivided into one or more fields, with the fields of multiple rows forming columns, the method comprising:
   compiling at least one column to determine a sequence of one or more field instructions, each field instruction including an algorithm for reconstructing column data;
   storing the field instructions in the database, in place of column data, thereby providing an encoded storage representation of field data associated with at least one column;
   reading the field instructions; and executing the field instructions to determine a data value using the field instruction and state information maintained for the respective column.

2. A method as in claim 1 wherein the step of executing the field instructions occurs as the field instructions are read in streaming fashion from a mass storage device.

3. A method as in claim 1 wherein a field instruction determines values for one or more fields.

4. A method as in claim 3 wherein a field instruction determines a value based on an opcode.

5. A method as in claim 3 wherein a field instruction determines a value from one or more immediate arguments.

6. A method as in claim 3 wherein a field instruction determines a value as a function of stored column state.

7. A method as in claim 3 wherein a field instruction determines a value as a function of stored column state and one or more immediate arguments.

8. A method as in claim 3 wherein a field instruction has no effect on column state.

9. A method as in claim 3 wherein a field instruction updates some or all of the column state.

10. A method as in claim 3 wherein a field instruction determines a value for one or more fields having no column state.

11. A method as in claim 3 wherein a field instruction determines a value based on a column state of more than one column.

12. A method as in claim 1 wherein the field instructions may comprise more than one operation.

13. A method as in claim 12 wherein the field instructions operate on a variable character string having a length and a text string argument and the length field is encoded as a first field instruction, and the text string is encoded as a second field instruction.

14. A method as in claim 1 wherein the encoding representation results in compression of data across one or more columns.

15. A method as in claim 1 wherein the resulting field instructions and any non-compiled field values are bit aligned.

16. A method as in claim 1 wherein the rows further comprise parameters that change the operation of the interpreting step.

17. A method as in claim 1 wherein for each row execution of the field instructions, one or more columns are skipped.

18. An apparatus for producing data values from a compiled table representation comprising:
a mass data storage device, for providing elements of a compiled table as a table page byte stream having fields;
a byte granular uncompressed payload demarcator, for demarcating rows of uncompressed fields from the byte stream;
a bit granular compressed payload demarcator, for demarcating rows of Field Reconstruction Instructions (FRI), each FRI including an algorithm for reconstructing column data on a bit granular basis from the byte stream;
a reconstruction execution engine, for executing the FRI, to produce at least one reconstructed field; and
a selector, for selecting either one or more of the uncompressed fields or reconstructed field, to produce a decomposed byte stream.

19. An apparatus as in claim 18 additionally comprising:
a restrict operator, for operating on the decomposed byte stream;
a project operator, for operating on the decomposed byte stream; and
a second selector, for selecting one or more of the output of the restrict or project operator to produce one or more of the output data values.

20. An apparatus as in claim 18 wherein the bit granular compressed pay load demarcator skips one or more incoming fields.

21. An apparatus as in claim 18 wherein the table page byte stream includes parameters applied to the reconstruction execution engine, to change interpretation of the FRIs.

22. An apparatus as in claim 18 wherein the bit granular demarcator additionally demarcates disjoint columns.

23. An apparatus as in claim 18 wherein the FRIs:
(a) are selected from a group consisting of a saved value, an add value to update a saved value, a recorded delta value, a delta value, or a full value that is recorded as a saved value for a next state; or
(b) specify how to determine a reconstructed field value as an operation or values obtained from two or more other columns; or
(c) specify a field data value as one of a null, empty, or blank data value; or
(d) comprise more than one operation; or
(e) specify an operation on a variable character string having a length and a text string argument, the length field is encoded as a first field instruction, and the text string is encoded as a second field instruction.

24. An apparatus as in claim 18 wherein the compressed payload encodes data across one or more columns.

25. An apparatus as in claim 18 wherein a field instruction determines values for a field from:
(a) its opcode [null, empty];
(b) from one or more immediate arguments [full];
(c) as a function of stored column state [saved, add];
(d) as a function of stored column state and one or more immediate arguments [delta];
(e) no effect on column state [null, empty, saved];
(f) updating some or all of the state of its subject columns [add, delta, full];
(g) having no column state; and/or
(h) the column state of more than a single column.

26. A computer program product for operating on a database, the database consisting of data organized into rows, the rows further subdivided into one or more fields, with the fields of multiple rows forming columns, the computer program product comprising:
a computer readable storage medium having computer readable program code embodied therewith, the computer readable program code comprising computer readable program code configured to:
compile at least one column to determine a sequence of field instructions, each field instruction including an algorithm for reconstructing the column data;
store the field instructions in the database, in place of column data, thereby providing an encoded storage representation of field data associated with at least one column;
read the field instructions; and
execute the field instructions to determine a data value using the field instruction and state information maintained for the respective column.

* * * * *